R. A. KENYON.
THREAD GAGE.
APPLICATION FILED JULY 14, 1920.

1,395,231.

Patented Oct. 25, 1921.

Inventor,
Roy A. Kenyon,
By Joseph A. Minturn
Attorney.

UNITED STATES PATENT OFFICE.

ROY A. KENYON, OF NEWCASTLE, INDIANA.

THREAD-GAGE.

1,395,231.   Specification of Letters Patent.   Patented Oct. 25, 1921.

Application filed July 14, 1920. Serial No. 396,113.

*To all whom it may concern:*

Be it known that I, ROY A. KENYON, a citizen of the United States, residing at Newcastle, in the county of Henry, and in the State of Indiana, have invented new and useful Improvements in Thread-Gages, of which the following is a specification.

This invention relates to improvements in micrometers or gages for measuring the pitch of the threads and the diameters of screw-threaded elements.

The object of the invention is to accurately and quickly measure the variation in pitch and diameter of threads, to provide an instrument that can be adjusted to different thread standards, to provide an instrument with gages for maximum and minimum tolerance in diameter, and to provide a gage that can be kept accurate by rotary adjustment of the gage after successive removal of the worn portions. By this instrument threaded objects that do not come in size and pitch within its degrees of tolerance may be quickly sorted by unskilled labor from those having the required accuracy.

I accomplish the above, and other objects which will hereinafter appear, by the mechanism illustrated in the accompanying drawing, in which—

Figures 1, 2:
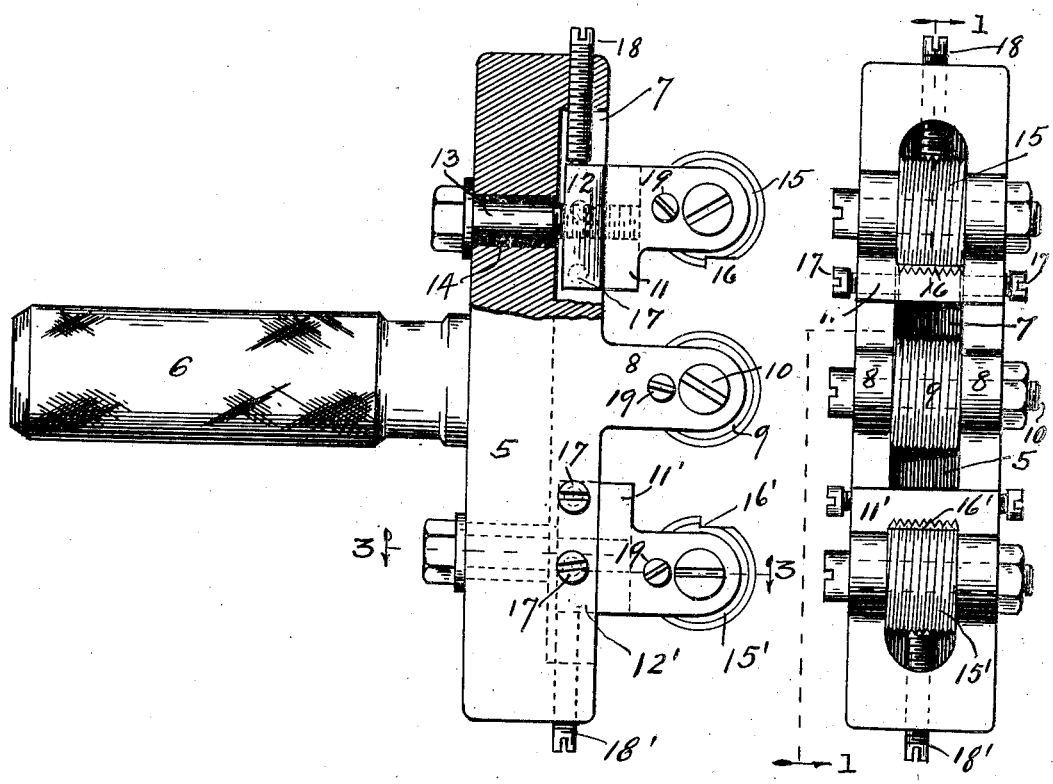
Figures 3, 4:
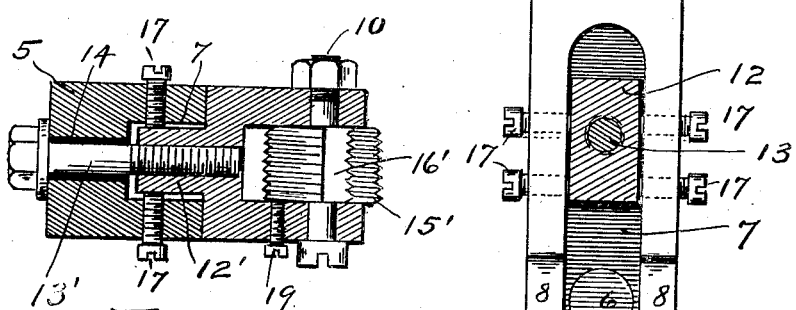

Figure 1 is a side elevation and partial section on the line 1—1 of Fig. 2, of my invention. Fig. 2, is a front view of same. Fig. 3, is a section on the line 3—3 of Fig. 1, and Fig. 4, is a front view of the instrument similar to Fig. 2, but with the middle gage, the lower gage and block and all but the shank of the upper gage block removed.

Like characters of reference indicate like parts in the several views of the drawing.

The body or head 5, is a rectangular bar substantially square in cross section, having a middle threaded hole in which the threaded end of a handle 6 is screwed. The front or side of the head opposite the handle has a longitudinal channel 7, and at the middle of the head are the two ears 8, 8, between which a gage 9 is mounted on a bolt 10. The gage 9 is cylindrical and is screw-threaded on its periphery to the standard of the thread to be measured. Above the gage 9 is a block 11 having a shank 12 loosely entering the channel 7. The shank and head have a threaded hole into which a bolt 13, passed through a vertically elongated slot 14 in the head, enters in the manner shown in Figs. 1 and 3. The front side of the block has a pair of ears between which is a gage 15, similar to gage 9, but differing in that it has a notch 16, the wall made by which is a radial plane extending to or below the base of the threads which are thus sharply defined and outlined for greater accuracy and visibility as standards of measurement and comparison. Passing through threaded holes in the channel walls on each side of the shank 12 are set screws 17,—a pair on each side, by means of which the shank is adjusted laterally of the head and firmly held when brought to the desired position. A set screw 18, through the head at the end of the channel, bears against the shank 12. Th block is raised, and held temporarily by suitable tightening of bolt 13, and thereupon the block is lowered as desired, by working the set screw.

A block 11' in all respects like block 11 except that it is assembled in reverse order, has a shank 12' entering channel 7. It has ears on the front side between which a gage 15' is mounted, the gage having a notch 16'. All three gages are mounted on bolts 10, and their given rotary adjustments are held by set screws 19. A bolt 13' and set screw 18' function the same as bolt 13 and set screw 18.

The operation of my invention is as follows: The middle gage 9 is set to bring unworn perfect threads in the plane common to all of the gages, where it is held by the set screws 19. Then the top gage 15 is raised more than is finally required and temporarily held by bolt 13; then it is brought toward gage 9 to a distance of minimum tolerance between the two, adjusted laterally for the required pitch relative to gage 9, the radial plane of the notch 16 brought into the plane of the axes of all of the gages, and when all of said adjustments are verified and found correct the block is fastened thereby tightening bolt 13 and the gage by tightening screws 19. The lower gage 15' is adjusted in a similar manner with relation to gage 9 to a distance of maximum tolerance.

In making a test the object tested as a shaft, pipe, or whatever it may be, is held with the axis of its threaded portion under test parallel with the axes of the bolts 10 on which the gages are mounted, and said threaded portion is brought into contact with the gage 9, between, for example, gage 9 and gage 15, with the threads of gage 9 entering between the threads to be tested. Then an effort is made to bring the axis of the object into the plane common to the axes of both gages 9 and 15 and if found too large it is discarded for that reason. If it goes in however with a snug fit it is within the tolerance allowed for diameter and also for pitch, which latter is shown by the edges of the wall made by notch 16 in the threads of gage 15.

Should the person testing the object have reason to believe that the diameter of the threaded part is less than the minimum tolerance he repeats the above test between gage 9 and the lower gage 16' which is provided for that purpose.

When the threads at the walls of the notches in gages 15 and 15' become imperfect by wear the notches are deepened circumferentially of the gage and the latter adjusted rotarily to bring the new parts into place.

Having thus fully described my invention, what I claim as new and wish to secure by Letters Patent of the United States, is:—

1. In a screwthread measuring device, the combination of a plurality of gage members each comprising a cylinder with screwthreaded periphery to receive the thread to be measured, the periphery of one of the gages being notched approximately the depth of its threads to a radial plane, said radial plane when the notched gage is in use being in a plane which is radial to a coöperating gage, and means for supporting the gages.

2. In a screwthread measuring device, the combination of a plurality of gage members each comprising a cylinder with screwthreaded periphery to receive the thread to be measured, the periphery of one or more of the gages being notched approximately the depth of its threads to substantially a radial plane on one side, said radial plane when the notched gage is in use being in a plane which is radial to a coöperating gage, means for supporting the gages, and means for adjusting one or more of the gages.

3. In a screwthread measuring device, the combination of a plurality of gage members each comprising a rotatable cylinder with screwthreaded periphery to receive the thread to be measured, the periphery of one or more of the gages being notched approximately the depth of its threads to approximately a radial plane on one side of the notch, said radial plane when the notched gage is in use being in a plane which is radial to a coöperating gage, and means for holding a given rotary position of the gages.

4. In a screwthread measuring device, a gage member comprising a rotatable cylinder with screwthreaded periphery to receive the thread to be measured, the periphery of the gage being notched approximately the depth of its thread to substantially a radial plane, said radial plane when the notched gage is in use being in a plane which is radial to a coöperating gage, and means for supporting the gages.

5. In a screwthread measuring device, the combination of a plurality of gage members each comprising a rotatable cylinder with screwthreaded periphery to receive the thread to be measured, the periphery of one or more of the gages being notched approximately the depth of its threads to approximately a radial plane on one side of the notch, said radial plane when the notched gage is in use being in a plane which is radial to a coöperating gage, and means for supporting the gages, means for holding a given rotary position of the gages, means to adjust the distance apart of the gages and means to adjust one or more of the gages in an axial direction.

6. In a screwthread measuring device, the combination of three gage members each comprising a rotatable cylinder with screwthreaded periphery to receive the thread to be measured, the gages being arranged substantially in the same plane, the peripheries of the two outer gages being notched approximately the depth of their threads to approximately a radial plane on one side of the notch, said radial plane when the notched gage is in use being in a plane which is radial to a coöperating gage, and means for supporting the gages, means for holding a given rotary adjustment of the gages, and means to independently adjust the two outer gages laterally and also in distance from the middle gage.

Signed at Newcastle, Indiana, this the 9th day of July, 1920.

ROY A. KENYON.